United States Patent Office 3,296,074
Patented Jan. 3, 1967

3,296,074
METHODS AND COMPOSITIONS FOR TREATING PSYCHOSES AND NEUROSES
Tohoru Yui, Osaka, and Yuji Takeo, Kyoto, Japan, assignors to Takeda Chemical Industries, Ltd., Osaka, Japan
No Drawing. Filed Sept. 23, 1964, Ser. No. 398,757
Claims priority, application Japan, Oct. 4, 1963, 38/53,409
12 Claims. (Cl. 167—65)

This invention relates to improvements in psychotherapeutic agents and, more concretely, to a novel medicinal use of 2-amino-4-methyl-6-methoxy-1,3,5-triazine and its pharmaceutically acceptable salts as psychoactive substances for the treatment of mental disorders such as neuroses and psychoses.

The therapy of serious psychosis has generally been thought to be quite difficult, although great efforts to solve this problem have extensively been made. Mainly, convulsive therapy by means of insulin shock or electro shock has been proposed as treatments for the said disorder, and two or three medicinal treatments are in supplementary use. However, none of the hitherto proposed treatments consistently gives the expected therapeutic effects.

According to the present invention, 2-amino-4-methyl-6-methoxy-1,3,5-triazine and its pharmaceutically acceptable salts, incorporating a novel chemical structure into the psychoactive substance field, show a remarkable and consistent therapeutic effect in the treatment of neuroses and psychoses without undesirable side-effects.

Thus the said compound and its said salts are useful as therapeutic agents in the therapy of the said mental disorders.

2-amino-4-methyl-6-methoxy-1,3,5-triazine, which is used as psychoactive substance according to the present invention, has the following properties—

Melting point: 257° C.;
Formula:

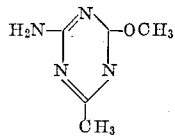

Solubility: soluble in water, alcohol, dilute alcohol and glacial acetic acid.

The said compound (I) can be synthesized in a variety of ways, for example:

(a) Ring closure condensation between guanyl-O-methylisourea and acetic acid esters in the presence of basic substance;

(b) Reaction of sodium salt of N,N' - dicyanoacetamidine with hydrogen chloride in dry methanol;

(c) Reaction between N - cyanoacetoimidoether and methylisourea in the presence of a basic substance;

(d) Reaction between 2 - amino - 4 - halo - 6 - methyl-1,3,5-triazine and methanol in the presence of a basic substance;

(e) Reaction between 2 - methyl - 4,6 - dimethoxy-1,3,5 - triazine and ammonia under elevated pressure, whereby one of the two methoxy groups in the former is replaced by amino.

The salts of compound (I) are prepared in a per se known manner, for example, by reacting the free base with a non-toxic acid, especially one selected from those which yield pharmaceutically acceptable, i.e. therapeutically useful, salts, such as inorganic acid salts (e.g. hydrochloride, hydrobromide, hydroiodide and sulfate); other pharmaceutically acceptable salts, e.g. salts with organic acids, can also be used. Throughout this specification, reference to "compound (I)" is intended to encompass also the therapeutically acceptable salts thereof. Dosages throughout are in terms of the free base.

An intraperitoneal administration of 2 - amino - 4-methyl - 6 - methoxy - 1,3,5 - triazine in an amount of about 50 to 100 milligrams per kilogram of body weight causes decrease of spontaneous activity, diminution of conflict behavior or taming effect in animals such as mouse, rat, cat and monkey; however, this dosage or even larger doses of the said compound do not elicit hypnotic action. Potentiation of barbital hypnosis, analgesic action, hypothermic action or anti-electroshock seizure are not observed on administration of compound (I).

Median lethal dose in acutely intraperitoneal administration of compound (I) to the mouse is about 850 milligrams per kilogram, which is comparable to about four hundred times as much as the therapeutic dose of the said compound. Repeated oral administration of compound (I) to rats in an amount of about 100 to 400 milligrams per day for 32 days causes no substantial histological changes in main organs such as heart, liver, spleen, kidney and alimentary tract.

Administration of 2 - amino - 4 - methyl - 6 - methoxy-1,3,5-triazine to patients suffering from chronic schizophrenia in an amount of about 20 to 100 milligrams per day causes a remarkable therapeutic effect, relief of autism, acceleration of volition, improvement of depressive state and activation of volitive behavior.

Administration of the said compound in larger doses than about 100 milligrams per day causes at times temporary decrease of urine volume, which reverts to normal state soon after reduction of dose or cessation of administration.

Examples of clinical tests are as follows:

*Clinical test 1*

Paranoid psychosis (a forty-nine year old woman): She has suffered from schizophrenia with hallucination for about ten years prior to this test. Daily administration of 2-amino-4-methyl-6-methoxy-1,3,5-triazine in an amount of 100 milligrams to the patient caused activation of emotionality and changes in content of hallucination. Moreover, she has become volitional and is now absorbed in manual-arts. In the early stage of treatment with the said compound, there was a temporary decrease of urine volume, which was restored to normality by reduction of the daily dosage to 60 milligrams, without any loss of the therapeutic effect. No appreciable changes were observed in blood pressure level and functions of heart, liver and kidney even after one month of treatment.

*Clinical test 2*

Simple type schizophrenia (an eighty year old woman): Typical case of involution resulting in reticence, apathy and flatness of emotional reaction for about five years prior to the present treatment. Administration of 2-amino-4-methyl-6-methoxy-1,3,5-triazine in an amount of 60 milligrams per day to the patient, who had never been improved by prior treatment with phenothiazine compounds, caused activation of voluntary behavior and increase of rapport with the psychiatrist without appreciable side effect.

Shortly after discontinuing dosage at the second week, these improved syndromes reverted to the initial conditions before treatment. (In such cases, resumption of treatment according to this invention restores achieved improvement.)

*Clinical test 3*

Hebephrenic type schizophrenia (a forty-nine year old man): He had been reticent, of poor facial expression and indifferent to his surroundings for preceding five years, and he had poor rapport with the psychiatrist. Administration of 2-amino-4-methyl-6-methoxy-1,3,5-triazine in an amount of 100 milligrams per day caused the patient to take an interest in his surroundings. He had previously constantly confined himself to his room, but now began to be interested in something to do, for example, to see television in another room and, at the same time, apathy was lessened and rapport with the psychiatrist was regained. There was no appreciable side effect even after one month of treatment.

*Clinical test 4*

Thirty-two hospitalized, schizophrenic patients with autism and involutional syndromes were selected for clinical study of 2-amino-4-methyl-6-methoxy-1,3,5-triazine with daily oral dosage ranging from 40 to 120 milligrams for 60 to 140 days. Of the total group twenty-nine patients had chronic schizophrenic syndromes which had developed more than two years before and resulted nearly in dissociation of personality. They never respond to any other psychotherapeutic drugs. Three other patients were of comparatively acute type. After about 20 to 30 days of treatment, fourteen of the twenty-nine chronic patients exhibited slightly emotional excitement and became volitional and regained rapport with the psychiatrist. Even after about 2 months of treatment, six of the above improved patients continued to progress favorably, but some syndromes of six other patients tended to deteriorate. Fifteen patients did not respond to treatment at all. One female patient of the three acute ones became volitional and began to speak to the psychiatrist especially about her own psychic problems. After about 20 days of treatment with 40 milligrams daily, the patient became active in her facial expression and in working, e.g. in lace-making, and thus became easy to subject to psychotherapy thereafter. The other two acute type patients did not respond to treatment.

Side effects were of no major importance; blood pressure levels, urine volume and composition, red and white cell counts did not change significantly during all the periods of treatment in all cases, but a little decrease of haemoglobin content was seen only in some cases. Three cases tested here showed slight (quantitatively insignificant) decrease in basal metabolic rate (BMR) and protein-bound iodine (PBI).

While 2-amino-4-methyl-6-methoxy-1,3,5-triazine and its pharmaceutically acceptable salts of the present invention may be administered alone, the said compounds are administrable in the form of pharmaceutical preparations with a suitable carrier such as powders, tablets, suspensions, emulsions, capsules and suppositories, due to the high stability of the compound. Also the said compounds are administrable as confectionery such as sweets, candies and chocolate bars in order to suit patient's taste.

The choice of the carrier is appropriately determined case by case, usually depending on or in accordance with the solubility of the compound and standard pharmaceutical practice.

Examples of the compositions are shown as follows, said examples being solely for the purpose of illustration and are not to be construed as limitations of this invention.

1. Tablets:  Per tablet, milligrams
   2-amino-4-methyl-6-methoxy-1,3,5-triazine ____ 20
   Lactose _____ 80
   Corn starch _____ 38
   Magnesium stearate _____ 2

Total _____ 140

They are processed into tablet form in per se known manner and, if desired, tablets so-prepared may further be coated with sugar, e.g. powdered sugar, to enhance palatability.

2. Emulsions:  Milligrams
   2-amino-4-methyl-6-methoxy-1,3,5-triazine ____ 200
   Sodium carboxymethylcellulose _____ 500
   Polysorbate 80 (U.S.P.) _____ 100
   Distilled water, up to 100 cubic centimeters.

2-amino-4-methyl-6-methoxy-1,3,5-triazine is finely pulverized in a mortar and sodium carboxymethylcellulose is added thereto. The mixture is thoroughly admixed and 0.1% aqueous polysorbate solution is added dropwise to the mixture under vigorous agitation to give a homogeneous orally administrable suspension. Only part of the emulsion can be administered at a time, if desired, in accordance with indicated daily dosage.

3. Suppositories:
   2-amino-4-methyl-6-methoxy-1,3,5-triazine
                                         milligrams 20
   Cacao butter _____ grams 2

They are processed into rectal suppositiories. Cacao butter is fused, and then fine powder of 2-amino-4-methyl-6-methoxy-1,3,5-triazine is added thereto. The mixture is heated with stirring on a water bath and is poured into a mold and kept standing to give rectal suppositories.

The foregoing formulations represent dosage unit forms for convenient administration of the psychoactive agent according to this invention. The 2-amino-4-methyl-6-methoxy-1,3,5-triazine in these formulations can be used in the form of one of the hereinbefore-mentioned salts in an amount corresponding to the indicated 20 or 200 milligrams of base. The base hydrochloride is a preferred salt, inter alia because of ready solubility (e.g. in water).

We claim:
1. A method for treating psychosis, which comprises administering 2-amino-4-methyl-6-methoxy-1,3,5-triazine to a patient suffering from psychosis; said compound being administered in an amount of 20 to 100 milligrams, in terms of the free base, per 50 kilograms of body weight per day.
2. The method as claimed in claim 1, wherein the active compound is in a pharmaceutically acceptable acid addition salt form.
3. The method as claimed in claim 1, wherein the active compound is in the hydrochloride form.
4. A method for treating neurosis, which comprises administering 2-amino-4-methyl-6-methoxy-1,3,5-triazine to a patient suffering from neurosis; said compound being administered in an amount of 20 to 100 milligrams, in terms of the free base, per 50 kilograms of body weight per day.
5. The method as claimed in claim 4, wherein the active compound is in a pharmaceutically acceptable acid addition salt form.
6. The method as claimed in claim 4, wherein the active compound is in the hydrochloride form.
7. The method of treating mental disorders of the type of psychoses and neuroses, which comprises administering to a patient an effective amount of a psychoactive agent, said psychoactive agent being 2-amino-4-methyl-6-methoxy-1,3,5-triazine.
8. The method of treating mental disorders of the type of psychoses and neuroses, which comprises administering to a patient an effective amount of a psychoactive agent, said psychoactive agent being a pharmaceutically acceptable acid addition salt of 2-amino-4-methyl-6-methoxy-1,3,5-triazine.
9. The method of treating mental disorders of the type of psychoses and neuroses, which comprises administering to a patient an effective amount of a psychoactive agent, said psychoactive agent being 2-amino-4-methyl-6-methoxy-1,3,5-triazine hydrochloride.

10. A pharmaceutical composition for treating psychoses and for treating neuroses, the composition consisting essentially of, as an active ingredient, 2-amino-4-methyl-6-methoxy-1,3,5-triazine and pharmaceutically acceptable carrier, the latter being selected from the group consisting of suppositories and confectioneries, said composition being administrable in dosage unit form in an amount of 20 to 100 milligrams, in terms of the free base, per 50 kilograms of body weight per day.

11. The composition as claimed in claim 10, wherein the active compound is in a pharmaceutically acceptable acid addition salt form.

12. The composition as claimed in claim 10, wherein the active compound is in the hydrochloride form.

No references cited.

JULIAN S. LEVITT, *Primary Examiner.*

S. J. FRIEDMAN, *Assistant Examiner.*